United States Patent [19]

Yamada et al.

[11] Patent Number: 4,878,933

[45] Date of Patent: Nov. 7, 1989

[54] APPARATUS FOR FUSION SPLICING OPTICAL FIBERS

[75] Inventors: Takeshi Yamada, Sakura; Yasukuni Osato, Narashino; Okosu Watanabe, Chiba; Masao Suzuki, Sakura; Osamu Kawata; Koushi Ishihara, both of Mito, all of Japan

[73] Assignees: Fujikura Ltd.; Nippon Telegraph & Telephone Public Corporation, both of Tokyo, Japan

[21] Appl. No.: 941,563

[22] Filed: Dec. 16, 1986

Related U.S. Application Data

[63] Continuation of Ser. No. 713,194, Mar. 18, 1985, abandoned.

[30] Foreign Application Priority Data

| Sep. 1, 1984 | [JP] | Japan | 59-183321 |
| Sep. 1, 1984 | [JP] | Japan | 59-183322 |
| Jan. 14, 1985 | [JP] | Japan | 60-4756 |

[51] Int. Cl.⁴ ............................................ C03B 23/207
[52] U.S. Cl. ........................................ 65/29; 65/4.2; 65/4.21; 65/4.3; 65/152
[58] Field of Search .................. 65/4.1, 4.2, 4.21, 4.3, 65/29, 36, 152

[56] References Cited

U.S. PATENT DOCUMENTS

| 4,266,852 | 5/1981 | Higgins et al. | 65/4.2 |
| 4,274,707 | 6/1981 | Pacey et al. | 65/4.21 |
| 4,350,867 | 9/1982 | Kinoshita et al. | 65/4.1 |
| 4,372,768 | 2/1983 | Zucker et al. | 65/4.21 |
| 4,548,669 | 10/1985 | Steinmann et al. | 65/152 |

FOREIGN PATENT DOCUMENTS 3138587 5/1982 Fed. Rep. of Germany .
3245229 6/1984 Fed. Rep. of Germany .

OTHER PUBLICATIONS

Journal of Lightwave Technology, vol. Lt-2, No. 2, Apr. 1984, pp. 185-191; N.Y., U.S.; O. Kawaia et al.: "A Splicing and Inspection Technique for Single-Mode Fibers Using Direct Core Monitoring", European Search Report.

Kato et al., "Arc-Fusion Splicing of Single-Mode Fibers 2: A Practical Splice Machine", Applied Optics, 6/82, pp. 1916-1921.

Primary Examiner—Arthur Kellogg
Attorney, Agent, or Firm—Frishauf, Holtz, Goodman & Woodward

[57] ABSTRACT

A pair of V-shaped slot blocks mounted movably on a base in both the X and Y directions and a microscope for observing the opposed state of optical fibers contained on the blocks, are provided in an apparatus for fusion splicing optical fibers. The microscope is mounted movably in the X and Y directions under a base, thereby observing the opposed states of the optical fibers from below.

7 Claims, 8 Drawing Sheets

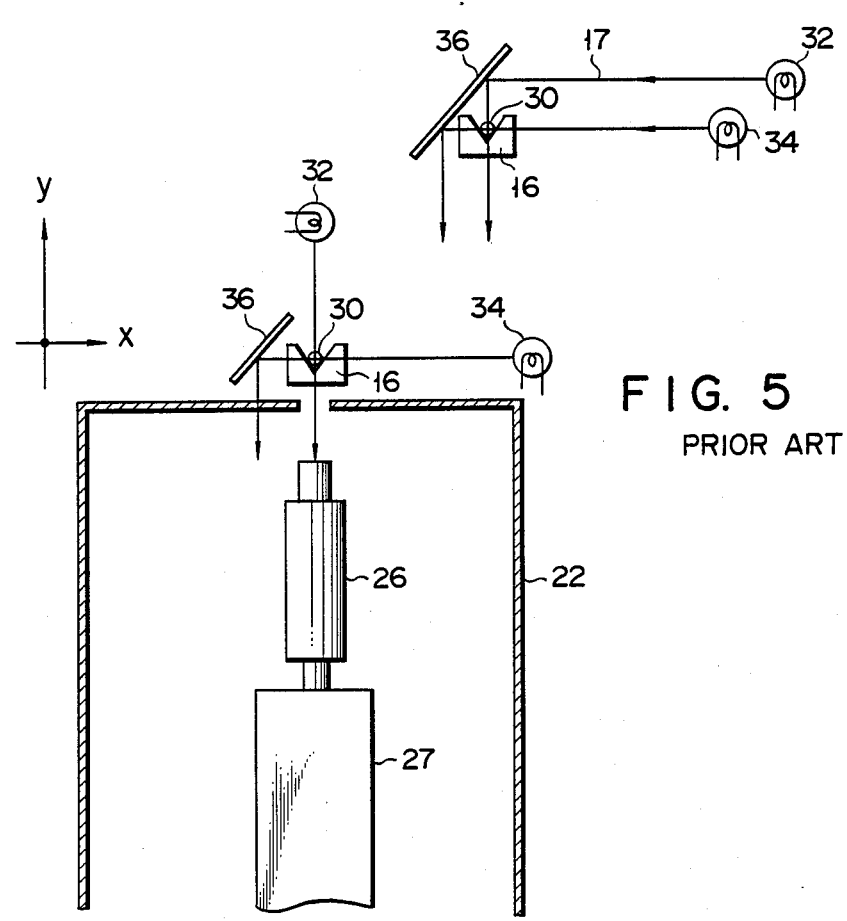
FIG. 6 PRIOR ART
FIG. 5 PRIOR ART
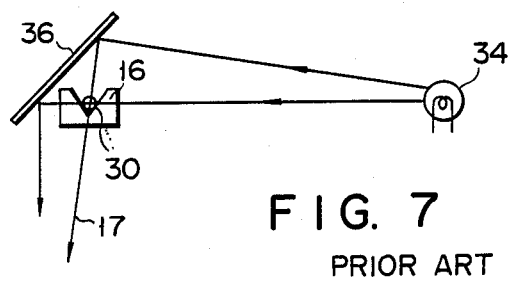
FIG. 7 PRIOR ART

APPARATUS FOR FUSION SPLICING OPTICAL FIBERS

This application is a continuation of application Ser. No. 713,194, filed 03/18/85 now abandoned.

BACKGROUND OF THE INVENTION

The present invention relates to an apparatus for fusion splicing optical fibers to each other.

When separated single mode light optical fibers are connected to each other, the end portions of the optical fibers are opposed to each other, and fusion spliced. In this case, it is necessary to accurately match the axes of the optical fibers before they are fusion spliced. Therefore, the matched state of the axes of the optical fibers is confirmed by a visual observation with a microscope or a TV camera. The axes of the optical fibers are matched individually in both vertical and horizontal directions.

In FIG. 1, reference numeral 10 designates a base, four posts are mounted on the base 10 (the posts disposed in front of and behind this paper are not shown, but the posts disposed at the right and left sides are shown in FIG. 1), and a planar base 14 is horizontally mounted on the posts 12. A pair of V-shaped slot blocks 16 which can be finely adjusted in a horizontal direction (in a X direction in FIG. 2) and in a vertical direction (in a Y direction in FIG. 2), and an optical fiber supporting unit 18 are mounted on the base 14. A controller 20 (such as a motor for moving the block 16) is disposed under the base 14, and a case 22 which extends between the base 10 and the base 14 is covered on the periphery of the controller 20.

A stand 24 is mounted on the base 10, and a microscope 26 is mounted on the stand 24 through an arm 25, disposed directly above the blocks 16. The position of the microscope 26 is not fixed, but can be adjusted when it is being used.

In order to observe the matching of the axes of the optical fibers in the horizontal direction of the cores of the optical fibers, the microscope 26 must be, as shown in FIG. 2, disposed on a rectilinear line for coupling between a light source 32 (provided directly under an optical fiber 30) and the optical fiber 30. The microscope 26 must also be adjusted so as to focus the cores of the optical fiber 30 on the line. Then, in order to observe the matching of the axes of the optical fibers in the vertical direction of the cores of the optical fibers, the microscope 26 must be disposed on the optical path of the light ray 15 from a light source 34, reflected by a mirror 36 through the X direction of the optical fiber 30, and the microscope 26 must be adjusted to the position so as to focus the core of the image 30' of the optical fiber 30. Thus, to observe the matching of the axes of the optical fibers, the position of the microscope 26 must be moved and adjusted several times.

As understood from FIG. 1, in the case of the above-described conventional microscope, the microscope 26 is mounted at the end of the arm 25 extended from, and above, the top of the long stand 24. Thus, even if a small force is applied to the apparatus, it affects the microscope 26 to a considerably large degree. Therefore, when the apparatus is contacted or a vibration is applied to the apparatus after the microscope is adjusted, the adjusted state of the microscope is immediately disordered, and the microscope must be again adjusted.

Particularly, when a TV camera 27 is fixed, as shown in FIG. 3, to the microscope 26, the weight applied to the arm 25 greatly increases. Thus, the movement of the apparatus, due to the external force, is large. In the apparatus shown in FIG. 3, an image is analyzed by a processor 28 as shown in FIG. 4, a fine adjustment unit 29 is moved on the basis of the result, and the position of the microscope 26 is automatically adjusted. However, in this case, the microscope 26 must be moved simultaneously with the TV camera 27. Therefore, the inertial effect is further increased as compared with the construction of the apparatus shown in FIG. 1 with the result that the starting and stopping of the unit cannot be smoothly conducted. The output of the fine adjustment unit 29 must also be increased. Incidentally, reference numeral 38 designates a TV monitor.

Further, in the conventional apparatuses shown in FIGS. 1 to 4, the microscope 16 and the TV camera 27 are exposed above the blocks 26. Thus, after the microscope is adjusted, an operator might carelessly contact the apparatus, and the microscope might be disordered.

SUMMARY OF THE INVENTION

The present invention has been made in consideration of this and has the object of providing an apparatus for fusion splicing optical fibers in a structure where a microscope is hardly affected by an external force in the matching of the axes of the optical fibers.

Another object of the present invention is to provide an apparatus for fusion splicing optical fibers in a structure so that its workability is enhanced by reducing its inertia, by decreasing the weight of a movable section.

Still another object of the present invention is to provide an apparatus for fusion splicing optical fibers in a structure so that a microscope can be readily positioned.

Still another object of the invention is to provide an apparatus for fusion splicing optical fibers in a structure so that a space can be reduced to be as small as possible.

In the present invention, as shown in FIG. 8, the apparatus is advantageously constructed so that a microscope 74 is mounted under a base 44 on posts 42 so as to be finely adjusted in both the X and Y directions and the matched state of the optical fibers can be observed from below the base 44.

The present invention also has advantageously, as shown in FIG. 8, an arrangement that a lens barrel 75 of the microscope 74 is separated into upper and lower lens barrels 76 and 78 and the upper barrel 76 connected to an objective lens 77 can be finely adjusted in both the X and Y directions.

The present invention further has advantageously, as shown in FIG. 8, an arrangement that a bundle fiber 87 is used, part 88 (in FIG. 12) of the light emitted from the bundle fiber 87 is deflected by a deflecting mirror 90 to pass the optical fiber 84 in the Y direction and other part 89 is passed through the fiber 84 in the X direction, and then reflected by the mirror 90 in the Y direction.

BRIEF DESCRIPTION OF THE DRAWINGS

FIGS. 5, 6 and 7 are views showing an optical path between different positions of the light source and the microscope from the light source;

DETAILED DESCRIPTION OF THE PREFERRED EMBODIMENTS

Figure 1:
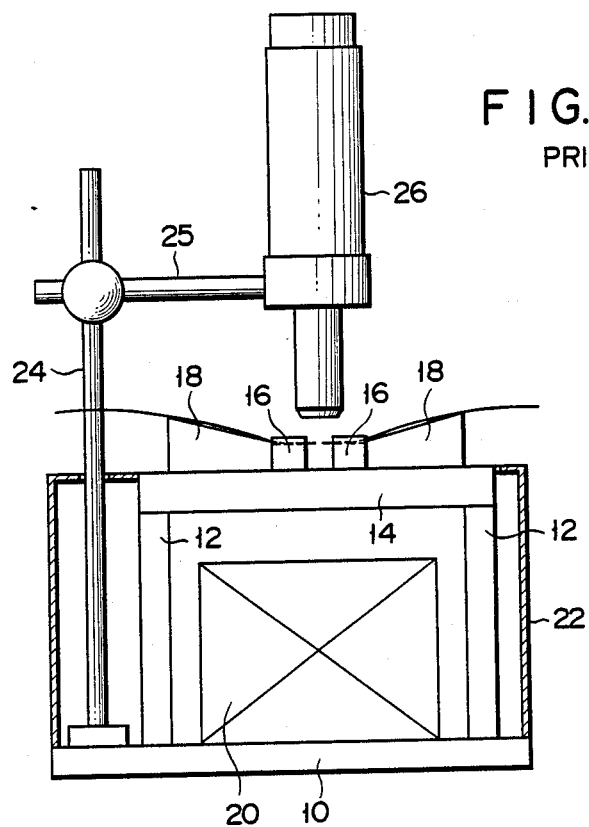
FIG. 1 is a view showing a conventional construction of an apparatus for fusion splicing optical fibers.
Figure 2:
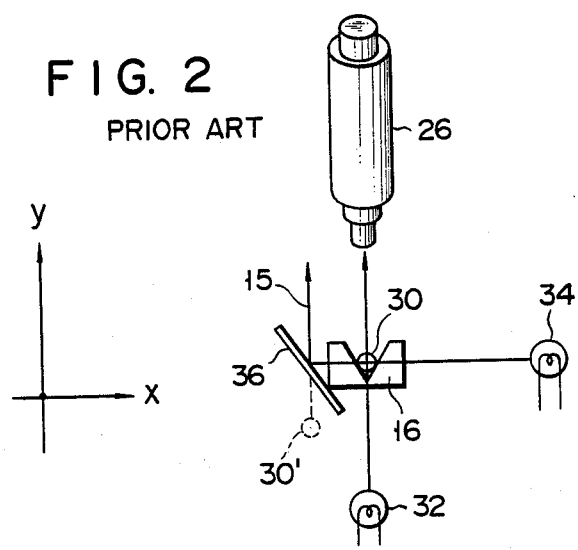
FIG. 2 is a view showing part of the apparatus of FIG. 1 and an optical path from a light source and a microscope.
Figure 3:
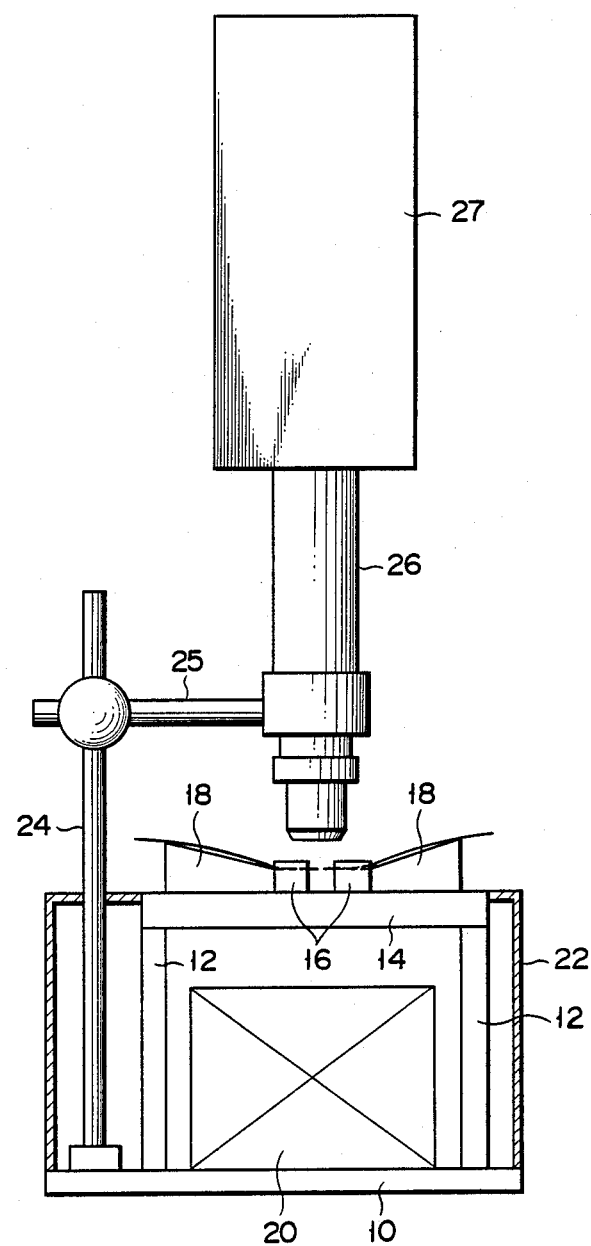
FIG. 3 is a view showing a TV camera attached to the construction of FIG. 1.
Figure 4:
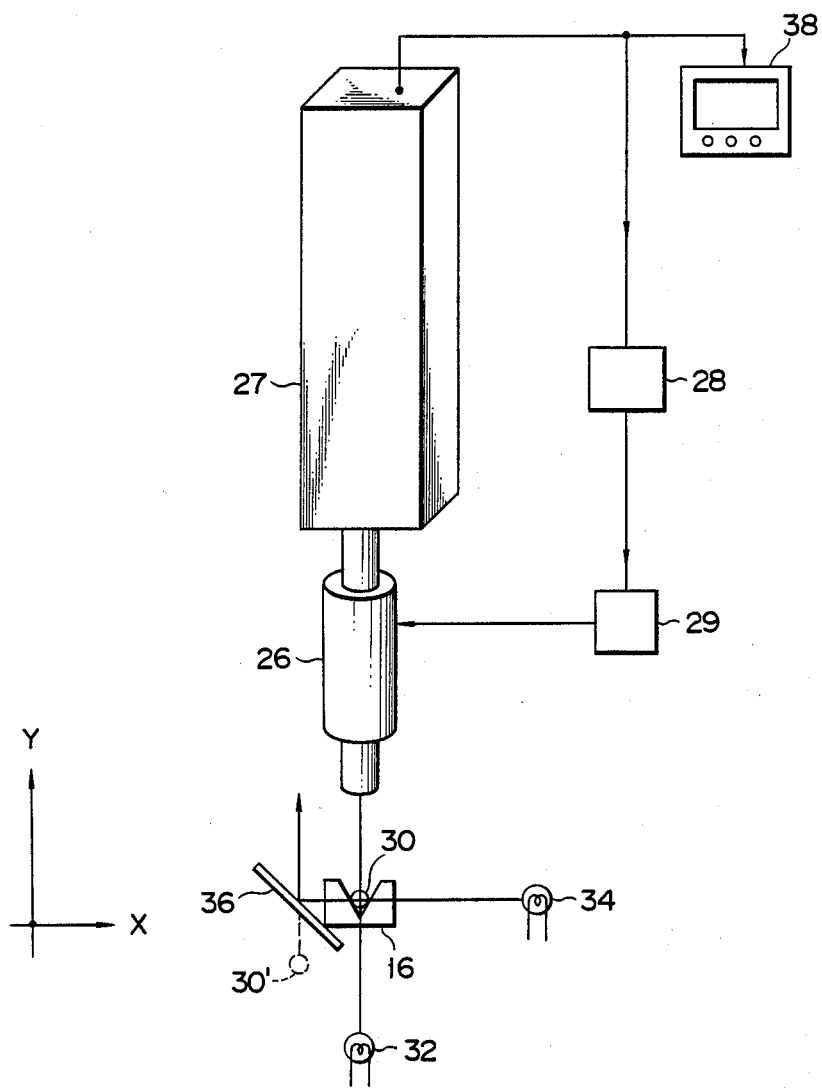
FIG. 4 is a view showing part of the apparatus of FIG. 3 and attached with a position adjusting loop from a TV camera to a microscope and a light source in the same manner as FIG. 2.
Figure 8:
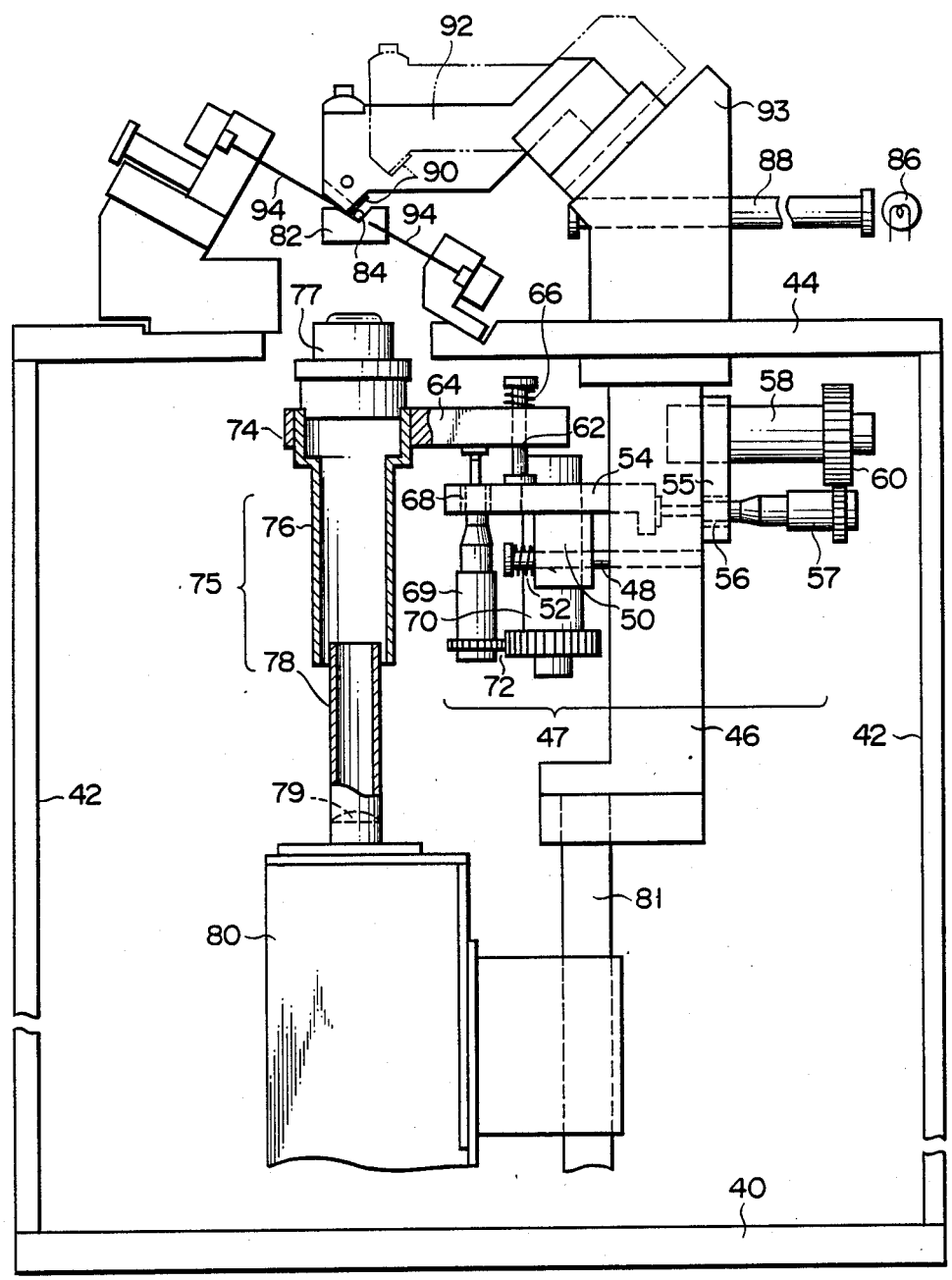
FIG. 8 is a view showing the construction of an apparatus for fusion splicing optical fibers according to the present invention.

In FIG. 8, reference numeral 40 designates a base. Four posts 42 are, for example, mounted on the base 40 (only two of them are shown, the other two in front of and behind this paper are omitted in FIG. 8 for the sake of simplicity of description), and a planar base 44 is horizontally mounted on the posts 42.

Two slender planar supporting members 46 are aligned at a predetermined interval behind this paper from the base 44. (However, only one is shown in FIG. 8, because the other one, disposed behind this paper, is not seen in superposition with the one shown). A microscope 74 is mounted to the members 46 through a fine adjustment unit 47 to be described in detail later.

More particularly, rods 48 (one of which is behind this paper but not shown) are horizontally projected respectively from the members 46, and a common horizontally movable member 50 with a square block shape is slidably mounted on the rods 48. Reference numeral 52 designates a spring for pressing the member 50 toward the members 46. A pedestal 54 with a thick plate shape is fixed onto the member 50 so that they can move together horizontally.

The members 46 are coupled by a lateral plate 55 (which extends in the depthwise direction of this paper) between the members 46, and a horizontally finely moving screw 57 (e.g., a male screw side of a is engaged horizontally with a female screw 56 secured to the plate 55 so that the end of the screw 57 is contacted with the pedestal 54. A motor 58 is mounted horizontally to the axis of the motor 58 on the plate 55. The rotation of the motor 58 is transmitted through a gear transmission mechanism 60.

Two rods 62 (one of which is disposed behind this paper and not shown) are erected on the pedestal 54, and a member 64 with a thick plate shape is slidably engaged with the rods 62 so that it can move up and down. Reference numeral 66 designates a spring for pressing the member 64 on the pedestal 54. A fine adjustment screw 69 is elevationally engaged with a female screw 68 secured to the pedestal 54 so that the top is contacted with the member 64. A motor 70 is mounted longitudinally on the axis on the pedestal 54. The rotation of the motor 70 is transmitted through a gear transmission mechanism 72.

Further, a mirror barrel 75 of a microscope 74 is separated into upper and lower lens barrels 76 and 78. An objective lens 77 is connected to the barrel 76. An eye lens 79 is provided at the barrel 78. The barrel 76 is fixed to the member 64 so that it can move up and down in response to the upward and downward movements of the member 64. A TV camera 80 is connected to the barrel 78, and the camera 80 is guided by a rod 81 connected to the lower end of the member 46 to extend vertically downwardly to be manually moved up and down, and secured by an engaging unit (not shown) to a predetermined position. Therefore, when the camera 80 and hence the barrel 78 are moved up or down, the optical cylindrical length of the microscope 74 varies, and the image on the TV monitor 96 varies greatly.

When the screw 57 rotates by the drive of the motor 58, the barrel 76 moves horizontally (in the X direction) through the pedestal 54, the rods 62 and the member 64.

When the screw 69 rotates by the drive of the motor 70, the barrel 76 moves vertically (in the Y direction) through the member 64.

Reference numeral 82 designates V-shaped slot blocks, and the X and Y direction fine adjustment mechanism (not shown) is mounted on the blocks. Though only one of the blocks is shown in FIG. 8, two blocks are actually provided behind this paper. The pair of blocks are disposed so that the V-shaped slots become rectilinear. Numeral 84 designates an optical fiber contained in the V-shaped slot of the block 82, and particularly the end of the optical fiber.

Numeral 86 denotes a light source, the light of which is emitted through a bundle fiber 87 formed by bundling a plurality of fibers to the fiber 84, horizontally. A plurality of optical fibers forming the bundle fiber 87 has a small numerical aperture (NA) value, and outputs parallel rays substantially forming a single light having a large diameter. Part of the output light of the bundle fiber 87 directly passes through the optical fiber 84, while another part of the output light is deflected by the deflecting mirror 90 and then passes through the fiber 84 at a right angle with the former part.

Numeral 90 depicts a mirror, which can be retarded to the position designated by an imaginary line on the oblique surface of a base 93 together with an arm 92 mounted thereon so as not to disturb the spark discharge when fusion bonding the optical fibers. For simplicity of illustration in the drawings, in FIG. 8, a processor for processing a signal upon receiving image information from the TV camera 80, a TV monitor for displaying the image information and a position adjustment unit for adjusting the V-shaped slot block by the output from the processor are omitted. They are respectively designated by reference numeral 95, 96, 98 in FIG. 12.

The TV image which becomes the basis of the adjustment when adjusting is done with the TV camera, will be described with reference to FIGS. 9, 10 and 11.

Figure 9:
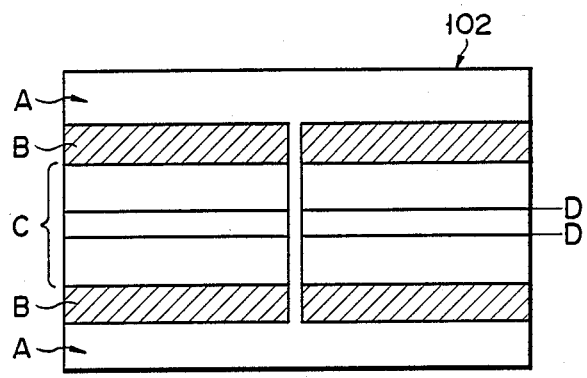
FIG. 9 is a view showing an image of the optical fiber projected onto a screen of a TV monitor and the illumination distribution.
Figure 10:
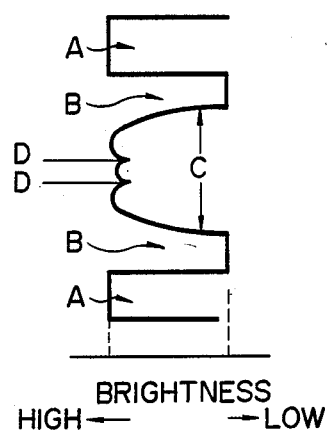
FIG. 10 is a view showing the illumination distribution of the image of FIG. 9.

FIG. 9 shows an enlarged image 102 and FIG. 10 shows the illumination distribution of the image 102.

The image 102 has, as shown in FIG. 9, three sections of different brightnesses. More particularly, they are as follows:

Section A (bright)

This section corresponds to an area of the light A' introduced to the lens 77 of the microscope 74 through locations separated from the optical fiber 84.

Section B (dark)

Figure 11:
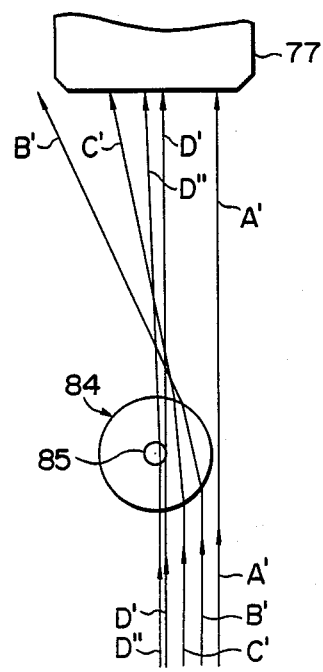
FIG. 11 is a view showing the light incident path to the microscope when the image of FIG. 9 is produced.

Since the optical fiber 84 is circular, the light B' incident to the fiber portion near the peripheral edge in FIG. 11 is largely refracted, and cannot be introduced into the lens 77. This dark section B corresponds to the area of nonincident light.

Section C (bright)

As shown by C' in FIG. 11, the light incident to the fiber portion near the center is introduced into the lens 77, and this section accordingly becomes bright. This bright section C corresponds to the light incident area. When the NA of the lens 77 is large, the width of the section C becomes wide, and the width of the section B becomes narrow. The areas of the sections C and B correspond to the fiber 84.

Two parallel lines D (slightly dark) extend in the section C along the longitudinal direction at both sides of the longitudinal axis. They occur because the light D' which passes near the outer peripheral edge of the core 85 linearly propagates in the cladding, while the light D'' which passes near the inner peripheral edge of the core 85 is slightly refracted. In other words, two lines D correspond to the peripheral edges of the core. Therefore, the portion between these two lines corresponds to the core.

Therefore, it is required for an accurate matching of the cores of the fibers that the block 12 be moved so that the axes of the lines D of the fibers are aligned with each other.

(1) When the light, passed through the optical fiber 84 in the Y direction, and the optical axis of the microscope 74, do not coincide, the image of the fiber 84 is formed at the end of the screen.

(2) When the light passed through the optical fiber 84 in the Y direction and the optical axis of the microscope 74 are not parallel with each other, the widths of the upper and lower sections become different.

(3) When the microscope 74 is not focused to the core, the width of the section C varies, and the boundary between the sections A and B becomes blurred. (Its differential coefficient varies.)

In order to accurately observe the matching of the axis of the optical fibers, the position of the microscope 74 must be adjusted so that the items (1), (2) and (3) above are satisfied.

Figure 12:
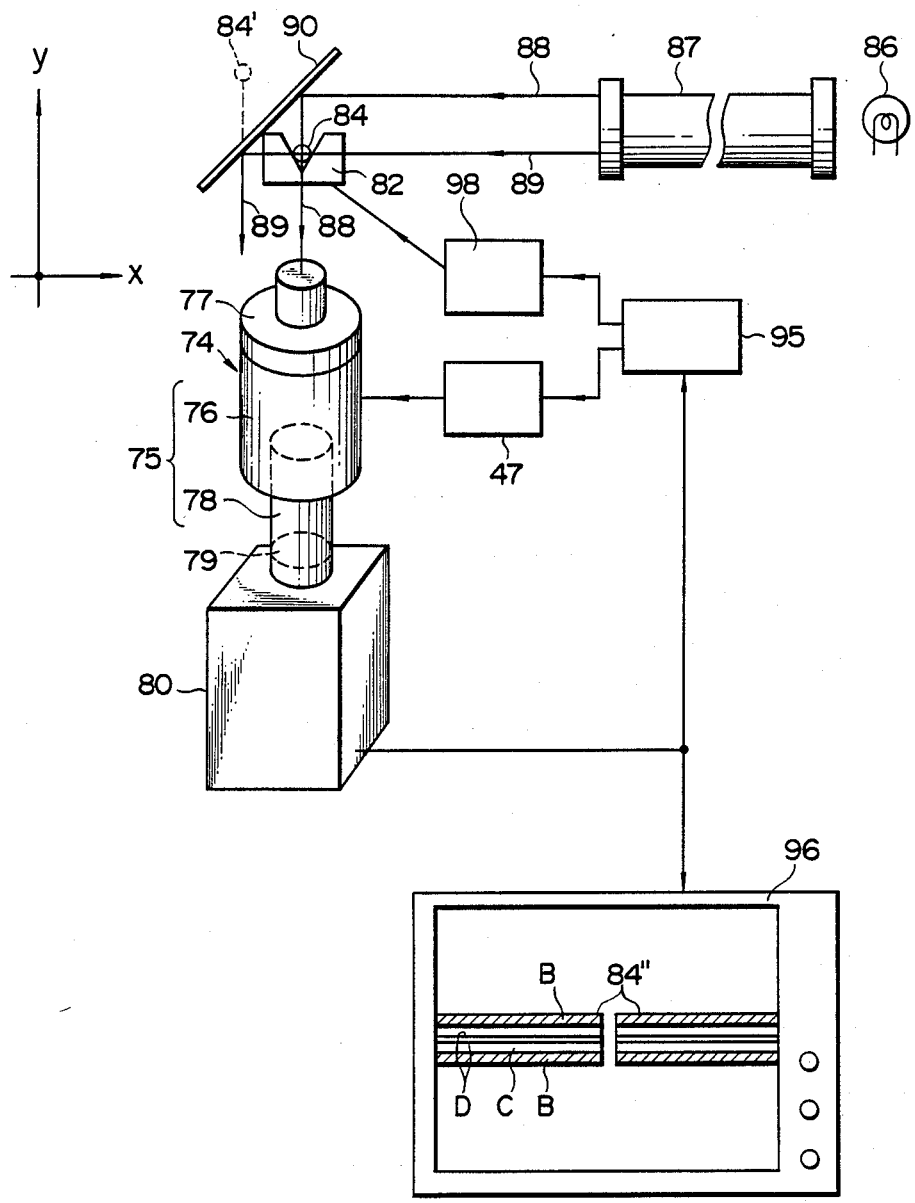
FIG. 12 is a view showing the detail of the path of the light from the light source to the microscope in the construction of FIG. 8 with a TV monitor and a position adjustment unit simplified in construction.

The operation of the apparatus shown in FIG. 8 will be described also with reference to FIG. 12. FIG. 12 shows the modification of the apparatus of FIG. 8 in the direction, illustrating the detail of the optical system from the light source 86 to the microscope 74 and also indicating simply the adjustment unit 47.

Matching of the axes of cores in a horizontal direction

Part 88 of the light introduced from the light source 86 to the bundle fiber 87 in a horizontal direction (the X direction) is incident and deflected to the mirror 90, and passed through the optical fiber 84 in the Y direction to the microscope 74. At this time, it is necessary for the optical axis of the fiber 84 and the optical axis of the microscope 74 to coincide. This is conducted by analyzing in advance the image of the camera 80 by the processor 95, and adjusting the position of the microscope 74 in the X direction by the operation of the motor 58 of the fine adjusting unit 47. More specifically, the dark section B is disposed at each side of the image 84'' of the fiber in the elongated direction, and two lines D are disposed in the bright section C. The lines D show the position of the core at the elongated peripheral edge in the elongated direction. The image information is inputted to the processor 95, and the motor 58 in the fine adjustment unit 47 is rotated in response to the processed result. When both optical axes are displaced, the center line of the image of the fiber in the elongated direction is displaced on the TV monitor 96. In this case, the motor 58 in the adjustment unit 47 is rotated so that the image 84'' of the fiber is disposed at the center by the output of the processor 95 to move the microscope 74 in the X direction. Microscope 74 is not focused to the exposed end of the core of fiber 84.

In this case, the width of the dark section B varies, and both edges of the dark section are out of focus. (The differentiation coefficient varies.) In this case, the motor 70 in the adjustment 47 is rotated by the output of the processor 95 to move the barrel 78 in the Y direction.

In this state, the image of the TV camera 80 is analyzed by the processor 95, the adjustment unit 98 is operated, in response to the analyzed result, to adjust the position of the block 82, with the result that the cores of the fibers are matched in the axes.

A method of matching the axes of the optical fibers by utilizing the TV camera 80 does not relate directly to the present invention, and the description will be omitted. (This method is, for example, disclosed in Japanese Patent Application No. 94454/1983.)

Matching of the axes of the cores of fibers in a vertical direction

Part of the light of the light source 86 introduced via the bundle fiber 87 is passed through the fiber 84 in the X direction, reflected by the mirror 90 in the Y direction, and incident to the microscope 74 as the light ray 89. The axis of the light ray 89 is slightly displaced from that of the light ray 88 in the X direction. The motor 58 in the adjustment unit 47 is rotated so that the image 84'' of the fiber is disposed at the center of the screen by the output from the processor 95 to move the barrel 76 in the X direction.

In this case, the barrel 78 and the camera 80 remains at the original position. Naturally, the displacement occurs in the optical axes between the lens 77 and the lens 79. However, the displacement of the optical axes is normally much smaller than the barrel length (which is the distance between the lens 77 and the camera 80), and is not a problem in practice. For example, when the barrel length is 210 mm, and the distance between the fiber 84 and the mirror 90 in horizontal direction is 0.2 mm, the displacement of the optical axes is $$\theta = \tan^{-1} 0.2/210 = 0.05 \text{ degree.}$$

The lens 77 is out of focus to the exposed end of the fiber 84 by this displacement, but, as described above, the both edges of the dark section B of the image are out of focus. This displacement is accurately adjusted by rotating the motor 70 by the output of the processor 95, and moving the barrel 76 in the Y direction.

After the axes of the optical fibers are matched in the horizontal and vertical directions, a signal is applied between a pair of electrodes to produce a spark, thereby connecting the ends of the optical fibers to each other.

Figure 13:
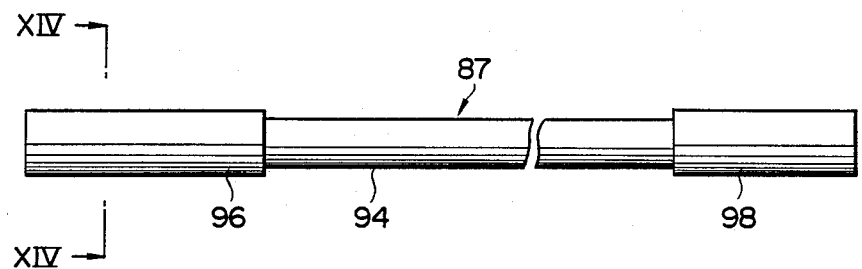
FIG. 13 is a view showing the construction of an example of a bundle fiber of the arrangement of FIG. 8.
Figure 14:
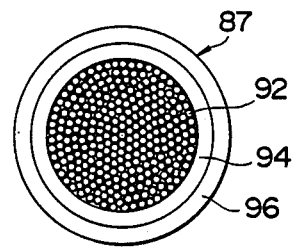
FIG. 14 is a sectional view of the bundle fiber of FIG. 13 as seen in a direction of an arrow along XIV–XIV.

An example of the bundle fiber 87 will be described with reference to FIGS. 13 and 14.

Numeral 92 designates a fiber bundle, which is formed, for example, by bundling 700 optical fibers of quartz with an outer diameter of 3 mm. The NA of the fiber 88 is equal to the NA of the respective fibers, and is, for example, NA=0.2. Further, vinyl chloride with a thickness of 0.5 mm is extruded thereon and covers the bundle, and stainless steel bases 96, 98 having a thickness of 0.55 mm and a length of 30 to 40 mm are covered on both ends.

In the construction of the apparatus in FIG. 8, the TV camera 80 is used to adjust the position of the microscope. This is not an indispensable requirement of the present invention. For example, the adjustment unit 47, 98 may be manually adjusted to adjust the microscope directly observing the microscope 74 without using the TV camera. In this case, the processor 95 and the TV camera 96 may be omitted.

In the construction of the apparatus in FIG. 12, the microscope 74 can be finely adjusted in the X and Y directions, under the base 44. The base 44 is supported on posts 42 erected on the base 40, and the microscope 74 can be preferably stabilized.

Since the distance from the base 40 to the microscope 74 is short, the microscope 74 is prevented from being applied with a large degree of moment. Therefore, the microscope might not be subjected to vibration. Further, the microscope 74 is not hung from the base 44, but rather its lower portion is contained in the case, thus the microscope is not manually contacted, and disorders due to any manual contact can be eliminated.

In the construction of the apparatus in FIG. 8, the barrel 75 of the microscope 74 is separated into upper and lower barrels 76 and 78, and only the barrel 76, connected to an objective lens 77, may be finely adjusted in both the X and Y directions. Thus, the inertia of the moving section can be reduced, thereby readily adjusting the microscope 74 at a proper condition. Therefore, this embodiment is particularly effective when the apparatus comprises a TV camera attached to the lower barrel 78.

In the above-mentioned construction, the light from the light source 86 is incident through the bundle fiber 87 to the fiber 84. The bundle fiber 87 is formed by bundling a plurality of optical fibers, and the emission NA of light of the bundle fiber is similar to that of the respective optical fibers. In other words, the bundle fiber 87 which is formed by bundling the optical fibers having small emission NAs, can form parallel light rays without depending upon the NA of the illumination light source. Thus, it is not particularly necessary to consider the selection of the distance between the optical fiber 84 and the light source 86.

Further, by using the bundle fiber 87 having a small value of NA, the parallel light rays can be produced by one light source. Thus, the necessary space can be reduced, which is particularly advantageous when automatically matching the axes of the optical fiber, and the microscope 74 and the TV camera 80 are contained in a case.

As described above, in the construction in FIG. 12, the following advantages can be provided.

(1) The microscope 74 is mounted under the base 44 mounted on the posts 42 so that it can be finely adjusted in the X and Y directions, and the optical fiber 84 can be observed from below.

(2) The barrel 75 of the microscope 74 is separated into the upper and lower barrels 76 and 78, and the upper barrel 76 is provided with the objective lens 77 and can be moved.

(3) By using the bundle fiber 87, part of the light emitted from the fiber 87 is passed to the fiber 84 in the X direction, and part of the emitted light is both deflected by the deflecting mirror 90, and passed through the fiber 84 in the Y direction.

However, the above features (1), (2), (3) are independently constructed in the embodiments of the apparatus of the invention, and the present invention need not be always combined by the features (1), (2) and (3). For example, as described in (1), even if the microscope 74 is mounted under the base 44 so that it can be finely adjusted in the X and Y directions, an embodiment of the present invention may thus be constructed. Similarly, as described in (2), the barrel of the microscope 74 is separated into the upper and lower barrels 76 and 78, and the lens 77 connected movably to the barrel 76 may form an embodiment of the present invention. Similarly, as described in (3) part of the light emitted from the bundle fiber 87 is passed through the fiber 84 in the X direction, and part of the light emitted is deflected by the deflecting mirror 90 in the Y direction and passed through the fiber 84 in the Y direction. This also forms an embodiment of the present invention.

In other words, the constructions in (1), (2) and (3) independently comprise embodiments of the present invention, and accordingly the embodiments (1), (2) and (3) are independently claimed in the appended claims.

What is claimed is:

1. An apparatus for fusion slicing optical fibers comprising:

posts;

a base supported by said posts;

a pair of V-shaped blocks, and mounting means for moving said blocks on said base in rectilinear X and Y directions defining a plane, said blocks having V-shaped slots adapted for receiving optical fibers the axis of each of which is substantially perpendicular to said plane, and said V-shaped slots being in line with each other;

light source means for emitting light consisting substantially of parallel light rays incident in said X direction;

deflecting means provided above said base for receiving a first group of said light rays prior to its passage through said optical fibers, and for deflecting said first group of light rays to pass through said optical fibers in said Y direction, and said deflecting means also receiving a second, different group of said light rays incident in said X direction after its passage through said optical fibers, and for deflecting said second group of light rays to said Y direction;

a microscope, provided under said base, including means for observing an opposed state of said optical fibers received in said slots, said observing means receiving said first group of light rays deflected to pass through said optical fibers in said Y direction to observe displacement of said optical fibers relative to each other in said X direction, and for receiving said second group of light rays deflected, after passing through said optical fibers, to said Y direction to observe displacement of said optical fibers relative to each other in said Y direction, said observing means including shifting means for adjusting the axis of the microscope along the X direction into alignment, respectively, with the deflected first group of light rays and the deflected second group of light rays; and means associated with said base for adjusting positions of said optical fibers relative to each other on the basis of an observation by said microscope.

2. An apparatus for fusion splicing optical fibers comprising:

posts;

a base supported by said posts;

a pair of V-shaped blocks, and mounting means for moving said blocks on said base in rectilinear X and Y directions defining a plane, said blocks having V-shaped slots adapted for receiving optical fibers the axis of each of which is substantially perpendicular to said plane, and said V-shaped slots being in line with each other;

light source means for emitting light consisting substantially of parallel light rays incident in said X direction;

deflecting means provided above said base for receiving a first group of said light rays prior to its passage through said optical fibers, and for deflecting said first group of light rays to pass through said optical fibers in said Y direction, and said deflecting means also receiving a second, different group of said light rays incident in said X direction after its passage through said optical fibers, and for deflecting said second group of light rays to said Y direction;

a microscope, provided under said base, including means for observing an opposed state of said optical fibers received in said slots, said observing means comprising upper and lower lens barrels aligned relative to each other in said Y direction, said upper lens barrel being movable in said Y direction and having an object lens, said lower lens barrel being fixed in said X direction and having an eye lens, said microscope including shifting means for moving the upper lens barrel in the X direction to receive said first group of light rays deflected to said Y direction to observe displacement of said optical fibers relative to each other in said X direction, and for shifting the upper lens barrel in the X direction to receive said second group of light rays deflected to said Y direction to observe displacement of said optical fibers relative to each other in said Y direction; and means associated with said base for adjusting positions of said optical fibers on the basis of an observation by said microscope.

3. An apparatus for fusion slicing optical fibers comprising:

posts;

a base supported by said posts;

a pair of V-shaped blocks, and mounting means for moving said blocks on said base in rectilinear X and Y directions defining a plane, said blocks having V-shaped slots adapted for receiving optical fibers the axis of each of which is substantially perpendicular to said plane, and said V-shaped slots being in line with each other;

a bundle fiber for emitting light rays toward said optical fiber in said X direction;

deflecting means provided above said base for receiving a first part of said light rays prior to its passage thereof through said optical fibers, and for deflecting said first light part to pass through the optical fibers in said Y direction, and said deflecting means also receiving a second part of said light rays guided by said bundle fiber after passage thereof through said optical fibers, and for deflecting said second light part to said Y direction;

a microscope, provided under said base, including means for observing an opposed state of said optical fibers received in said slots, said observing means receiving said first light part deflected to pass through the optical fibers n said Y direction, and for receiving said second light part deflected, after passing through said optical fibers, to said Y direction to observe displacement of said optical fibers relative to each other in said Y direction, said observing means including shifting means for adjusting the axis of the microscope along the X direction into alignment with, respectively, the deflected first light part and the deflected second light part; and means associated with said base for adjusting positions of said optical fibers on the basis of an observation by said microscope.

4. An apparatus according to claim 1, in which said shifting means comprises upper and lower lens barrels disposed in said Y direction, said upper lens barrel being movable in said X direction and having an object lens, and said lower lens barrel being fixed in said X direction and having an eye lens.

5. An apparatus according to claim 1, further comprising a bundle fiber for emitting parallel light rays toward said optical fibers in said X direction.

6. An apparatus according to claim 2, further comprising a bundle fiber for emitting parallel light rays toward said optical fibers in said X direction.

7. An apparatus according to claim 4, further comprising a bundle fiber for emitting parallel light rays toward said optical fibers in said X direction.

* * * * *